3,546,269
METHOD OF PREPARING γ-HYDROXY-BUTYRONITRILE

Hachiro Wakamatsu, Tokyo, Susumu Tatsumi, Seiichi Sato, and Jiro Sato, Kawasaki-shi, and Mikio Nomura, Yokohama-shi, Japan, assignors to Ajinomoto Co., Inc., Tokyo, Japan
No Drawing. Filed Apr. 23, 1968, Ser. No. 723,617
Claims priority, application Japan, Apr. 27, 1967, 42/27,200
Int. Cl. C07c *121/34*
U.S. Cl. 260—465.6                          4 Claims

ABSTRACT OF THE DISCLOSURE

γ-Hydroxybutyronitrile is formed in high yields by reacting acrylonitrile with hydrogen and carbon monoxide in the presence of a cobalt catalyst in a solvent medium mainly consisting of normally liquid aromatic hydrocarbons, cyclic ethers, or alkyl esters of alkanoic acids having no more than ten carbon atoms, at temperatures between 160° C. and 250° C.

---

This invention relates to the preparation of γ-hydroxybutyronitrile, and particularly to the preparation of γ-hydroxybutyronitrile from acrylonitrile.

γ-Hydroxybutyronitrile is an intermediate for the synthesis of α-pyrrolidone, a monomer base for synthetic resins, and a solvent for compounds of high molecular weight and for gases, such as acetylene.

γ-Hydroxybutyronitrile was prepared heretofore from trimethylene halohydrines by reaction with alkali metal cyanides (J. Org. Chem. 26 (1961) 3685), from γ-butyrolactone and ammonia (British Pat. No. 860,909), or by hydrogenation of β-cyanopropionaldehyde (Kogyo Kagaku Zasshi 65 (1962) 548). The known methods are not economical for use on an industrial scale because of low yield or because of the high cost of the necessary reactants and catalysts.

It has now been found that γ-hydroxybutyronitrile can be synthesized in a one-step reaction by reacting acrylonitrile with hydrogen and carbon monoxide in the presence of a cobalt-bearing catalyst which forms cobalt carbonyl with the carbon monoxide present, if the solvent medium consists entirely or predominantly of normally liquid aromatic hydrocarbons, cyclic ethers, or alkyl esters of alkanoic acids having no more than ten carbon atoms, at temperatures between 160° C. and 250° C.

It is known to convert acrylonitrile to β-cyanopropionaldehyde by hydroformylation. It is also known that the aldehydes prepared by hydroformylation from olefinic compounds can be directly converted to the corresponding alcohols if sufficiently severe reaction conditions are selected. The direct conversion of a cyanoaldehyde so prepared to the corresponding hydroxynitrile, however, was not attempted heretofore, and was not considered feasible because of the sensitivity of the cyano radical to hydrogenation conditions. It is known that propylamine is formed as a by-product when acrylonitrile is hydroformylated in methanol (Kogyo Kagaku Zasshi 65 (1962) 184; see also U.S. Pat. No. 2,644,842 and Can. J. Chem. 42 (1964) 1490).

It was, therefore, quite unexpected that the choice of a solvent should modify the reaction in such a manner as to lead directly from acrylonitrile to γ-hydroxybutyronitrile in a single step.

The usual cobalt bearing hydroformylation catalysts are effective in the reaction of this invention, that is, cobalt carbonyls, or finely divided cobalt metal and cobalt compounds and complexes which yield cobalt carbonyl under hydroformylation conditions. The effectiveness of the cobalt catalyst is enhanced if it is a complex of cobalt with carbon monoxide and a trialkylphosphine, triarylphosphine or trialkylarsine, for example, bis-[tri-n-butylphosphine-tricarbonylcobalt (O)], bis-[triphenylphosphine-tricarbonylcobalt (O)] and bis-[tributylarsine-tricarbonylcobalt (O)]. Ligands such as triarylphosphite, trialkylarsenite, or triarylarsenite cause undesirable polymerization and reduce the yield of γ-hydroxybutyronitrile, although they are equivalent to the trialkylphosphines and arsines, and triarylphosphines in other hydroformylation reactions (see published Japanese application No. 1402/1964).

Rather surprisingly, the catalyst is not inhibited by the presence of the basic 2-iminotetrahydrofuran in the reaction mixture in which it is in equilibrium with γ-hydroxybutyronitrile (see Tetrahedron Letters, 1966, 1827). In view of the fact that basic compounds are known sharply to reduce the yield of hydroformylation reactions in the presence of cobalt catalysts, while the desired compound is produced by the method of the invention in high yields, and in view of the unusual lack of equivalency of arsenic and phosphorus used as ligands in the catalyst complexes, it appears that acrylonitrile reacts with hydrogen and carbon monoxide under the conditions of this invention in a manner not generally observed in the hydroformylation of olefinic compounds.

The solvents necessary for obtaining γ-hydroxybutyronitrile directly and in high yields are liquid at normal temperature. They are aromatic hydrocarbons, such as benzene, toluene, xylenes, or ethyl benzene, cyclic ethers which are polymethylene oxides, such as tetrahydrofuran or dioxane, or alkyl esters of alkanoic acids having no more than ten carbon atoms and of the formula $C_nH_{2n+1}COOC_mH_{2m+1}$, wherein $n$ is an integer between 0 and 8, $m$ is an integer between 1 and 9, and $n+m$ is between 1 and 9. Preferred esters are methyl and ethyl formate, as well as methyl, ethyl, n-octyl, and 2-ethylhexyl acetate.

Other solvents normally used in hydroformylation reactions, such as methanol, ethanol, isopropanol, and n-hexane may be present in small amounts. When they exceed 10% by volume of the solvents present, they significantly reduce the yield. Solvent media consisting entirely of benzene, toluene, and/or tetrahydrofuran make the process most economical under present conditions.

The reaction does not take place at an industrially practical rate at temperatures lower than 160° C. At temperatures above 250° C., side reactions occur. The normally preferred operating temperatures are therefore between 180° and 230° C.

The gaseous reactants are provided in a ratio of hydrogen to carbon monoxide between 1:2 and 10:1, best yields at high reaction rate being obtained at ratios between 1:1 and 4:1. The partial pressure of carbon monoxide in the reaction zone is preferably held between 30 and 150 kg./cm².

The initial acrylonitrile concentration in the solvent medium should be between 0.1 and 5 moles per liter, a preferred upper limit of 2 moles per liter being maintained if cobalt carbonyl is the catalyst. Higher concentrations, typically 3 to 5 moles per liter, are most satisfactory with cobalt complexes containing trialkylphosphine, trialkylarsine or triarylphosphine. The catalyst should provide 0.5 to 4 g. cobalt per liter, a range of 1 to 2 g./l. being preferred. Higher catalyst concentrations are effective but are uneconomical in the absence of additional beneficial results.

The reaction mixture may be worked up in a conventional manner to recover the γ-hydroxybutyronitrile. The catalyst may be decomposed to insoluble cobalt compounds by means of atmospheric oxygen, the precipitate may be separated from the liquid fraction of the mixture by filtration, the solvent evaporated from the filtrate, and the oily residue fractionated.

The reactants employed, acrylonitrile, carbon monoxide, and hydrogen, are available at low cost. Because the γ-hydroxybutyronitrile is formed in a single step, the equipment needed and its operation are inexpensive. The overall reaction time is less than one half of that of the best method available heretofore for synthesizing the compound.

The following examples are further illustrative of this invention.

EXAMPLE 1

500 milliliters of a benzene-solution containing 26.5 g. (1 mole/liter) acrylonitrile and 2.9 g. dicobaltoctacarbonyl (2 g./l. Co) was placed in a one-liter shaking autoclave. The air in the autoclave was displaced by carbon monoxide, and enough synthesis gas ($H_2:CO=2:1$) was introduced into the autoclave to raise the pressure to 210 kg./cm.$^2$ at room temperature.

The autoclave was heated to 200° C. for 60 minutes and then cooled to ambient temperature. Gas absorption had lowered the pressure by 60 kg./cm.$^2$. Pressure was released, and the contents of the autoclave were sufficiently contacted with air at 50° C. for 3 hours. The precipitate formed was removed by filtration, the benzene was evaporated from the filtrate, and the oily residue was fractionated under reduced pressure. γ-Hydroxybutyronitrile was obtained as a fraction boiling at 88° C.–90° C. at 3 mm. Hg. The yield was 26.5 g. (53%). A sample of the crude reaction mixture was found by gas chromatography to contain γ-hydroxybutyronitrile in a yield of 60% based on the acrylonitrile employed.

EXAMPLE 2

The effects of various process variables on the yield are seen in the following table which lists the results of test runs performed in a 100 ml. autoclave equipped with a magnetic stirrer using 50 ml. of a solution of acrylonitrile and of a catalyst in a solvent. The procedure was generally similar to that described in Example 1, except as specifically noted.

The catalyst Type I was dicobaltoctacarbonyl, Type II bis-[tri-n-butylphosphine-tricarbonylcobalt (O)].

EXAMPLE 3

A solution of 290 mg. dicobaltoctacarbonyl and 325 mg. tri-n-butylphosphine in 50 ml. benzene was placed in the aforedescribed 100 ml. autoclave. Air in the autoclave was displaced by carbon monoxide, and an equimolecular mixture of hydrogen and carbon monoxide was introduced until the pressure at room temperature reached 100 kg./cm.$^2$. The autoclave was then heated to 140° C. for 20 min., cooled to room temperature, and opened. 2.7 g. of acrylonitrile was then introduced, the air was again displaced by carbon monoxide, and a synthesis gas ($H_2:CO=2:1$) was introduced at a sufficient rate to keep the gas pressure in the autoclave between 60 and 70 kg./cm.$^2$ while the autoclave was heated to 200° C. for 30 minutes, when gas absorption stopped.

The reaction mixture contained γ-hydroxybutyronitrile in a yield of 40% based on acrylonitrile, as determined by gas chromatography.

What is claimed is:

1. A method of producing γ-hydroxybutyronitrile which comprises holding acrylonitrile with carbon monoxide and hydrogen in a reaction zone in solution in a normally liquid solvent selected from the group consisting of benzene, alkylbenzene, cyclic ethers which are polymethylene oxides, and alkyl esters of alkanoic acids, said esters having not more than ten carbon atoms at a temperature of 160° to 250° C. and a partial carbon monoxide pressure of 30 to 150 kg./cm.$^2$ in the presence of a cobalt bearing catalyst until γ-hydroxybutyronitrile is formed, said catalyst being capable of yielding cobalt carbonyl at said temperature and pressure in the presence of said carbon monoxide.

2. A method as set forth in claim 1 the ratio of said hydrogen to said carbon monoxide being between 1:2 and 10:1, the partial pressure of said carbon monoxide in said reaction zone being between 30 and 150 kg./cm.$^2$ the initial concentration of said acrylonitrile in said solvent being 0.1 to 5 moles per liter, and said catalyst providing 0.5 to 4 g. cobalt per liter.

3. In a method as set forth in claim 2, recovering said γ-hydroxybutyronitrile.

4. A method as set forth in claim 2, wherein the normally liquid solvent is benzene, toluene or tetrahydrofuran.

| Solvent | Acrylonitrile mole/l. | Catalyst Type | Catalyst Co, g./l. | $H_2/CO$ | Initial, kg./cm.$^2$ | Temp., °C. | Time, min. | Absorp., kg./cm.$^2$ | Yield, percent |
|---|---|---|---|---|---|---|---|---|---|
| Benzene | 2 | I | 2 | 2 | 240 | 180 | 95 | 109 | 50 |
| Do | 2 | I | 2 | 2 | 240 | 200 | 45 | 122 | 56 |
| Do | 1 | I | 1 | 2 | 210 | 200 | 45 | 60 | 62 |
| Do | 1 | I | 2 | 4 | 250 | 200 | 45 | 69 | 60 |
| Do | 1 | II | 1 | 2 | 210 | 200 | 60 | 46 | 48 |
| Do | 0.5 | I | 2 | 2 | 210 | 200 | 25 | 35 | 63 |
| Do | 0.5 | I | 1 | 2 | 210 | 230 | 15 | 30 | 61 |
| Toluene | 2 | I | 2 | 2 | 240 | 230 | 20 | 112 | 58 |
| Do | 2 | II | 1 | 2 | 240 | 200 | 150 | 90 | 50 |
| Do | 1 | I | 1 | 2 | 210 | 200 | 50 | 60 | 61 |
| Ethyl acetate | 2 | II | 1 | 2 | 240 | 200 | 150 | 94 | 46 |
| Methyl propionate | 1 | I | 2 | 2 | 180 | 200 | 40 | 62 | 66 |
| 2-ethylhexyl acetate | 1 | I | 2 | 2 | 180 | 200 | 50 | 68 | 45 |
| Do | 1 | II | 2 | 2 | 180 | 200 | 55 | 47 | 48 |
| Tetrahydrofuran | 1 | I | 2 | 2 | 180 | 200 | 30 | 61 | 55 |
| Do | 1 | II | 2 | 2 | 180 | 200 | 40 | 50 | 45 |
| Dioxane | 1 | II | 2 | 2 | 180 | 200 | 25 | 44 | 40 |
| i-Propanol benzene (1:9) | 2 | I | 2 | 2 | 240 | 180 | 300 | 128 | 34 |

References Cited

UNITED STATES PATENTS 3,337,603   8/1967   Kato et al. _____ 260—465.6XR

OTHER REFERENCES

C. A. vol. 52, page 13777 (1958)—Kodama et al.

JOSEPH P. BRUST, Primary Examiner

U.S. Cl. X.R.

260—347.7, 465.1